Nov. 5, 1940.    O. HASKELL    2,220,326
HOLDER FOR GRINDING DRILLS
Filed Feb. 12, 1940
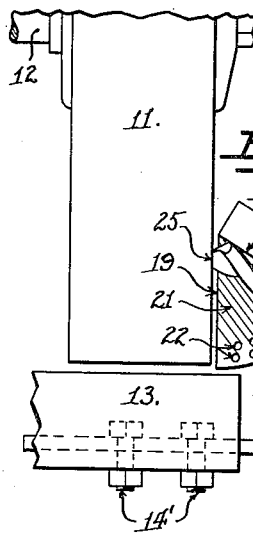
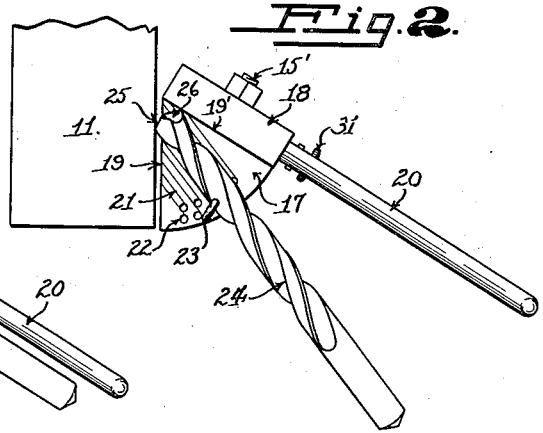
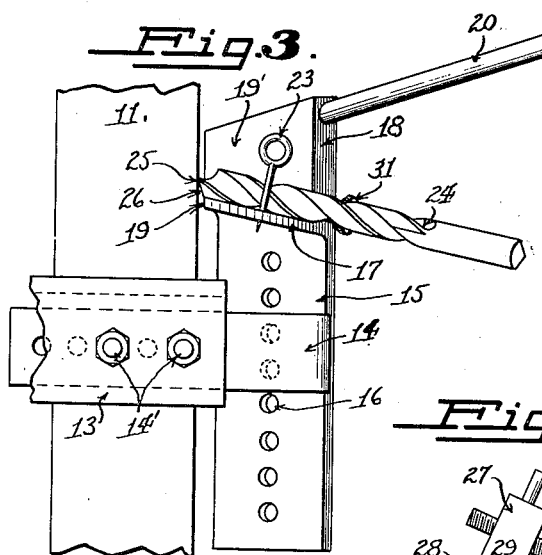
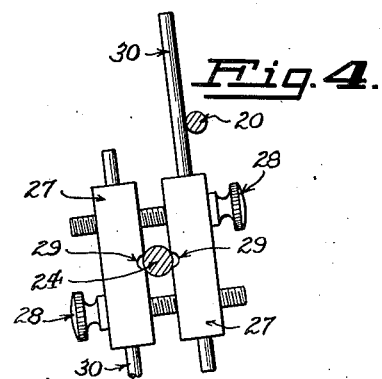
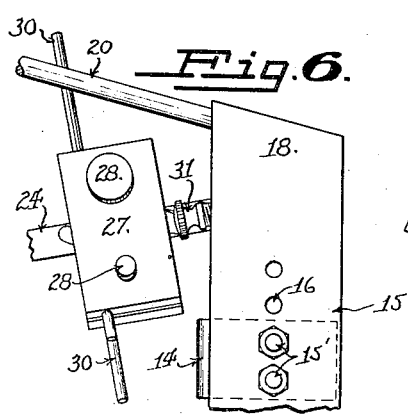
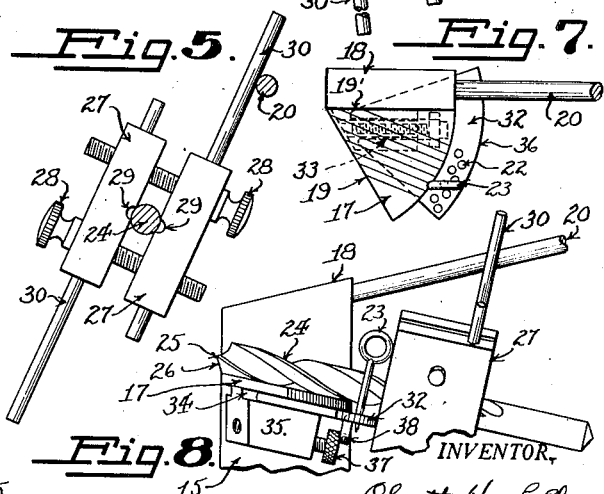
INVENTOR.
Olcott Haskell
BY Booth & Booth
ATTORNEYS.

Patented Nov. 5, 1940

2,220,326

UNITED STATES PATENT OFFICE 2,220,326

HOLDER FOR GRINDING DRILLS

Olcott Haskell, Sausalito, Calif.

Application February 12, 1940, Serial No. 318,502

7 Claims. (Cl. 51—219)

The present invention relates to tool holders for grinding wheels, and more particularly to an apparatus for holding a twist drill while the same is being ground by a wheel.

The principal object of the invention is to provide a holder of simple construction, adapted for attachment to any grinding wheel, in which the drill is held accurately, and which permits of accurate movement of the drill to the extent necessary to grind the proper cutting faces or lips on its end. Another object is to provide a holder which insures absolute symmetry between the several faces of the drill, and which automatically establishes the correct angles both for the cutting edges and for the clearance of the rear portions of the faces. A still further object is to provide a holder which is easy and quick to use, which has the least possible number of adjustable parts, and which permits the drill to be removed and replaced instantly for cooling and inspection, during the drilling operation.

Other objects and advantages of the invention will become apparent from the following specification, which should be read with the understanding that changes, within the limits of the claims hereto appended, may be made in the form, proportions and arrangements of the several parts as herein described and illustrated without departing from the spirit of the invention.

A preferred embodiment of the invention is illustrated in the accompanying drawing, in which:

Fig. 1 is a plan view of one form of the holder attached to a grinder, showing the initial position of the drill for setting the various adjustments.

Fig. 2 is a plan view showing the second position of the drill necessary to set the adjustments.

Fig. 3 is a front elevation of the form of device shown in Figs. 1 and 2, the drill being in the same position as in Fig. 2.

Fig. 4 is an elevation of the drill chuck as seen from the shank end of the drill, the drill and the guide rod being shown in section, and the chuck and drill being in their initial position.

Fig. 5 is a part sectional elevation similar to Fig. 4, the chuck and drill being shown in final position.

Fig. 6 is a side elevation of the device as seen from the right of Fig. 3, the chuck and drill being shown in initial grinding position.

Fig. 7 is a plan view showing a modified form of limiting stop, the drill and chuck being omitted.

Fig. 8 is a front elevation of the form of device illustrated in Fig. 7, showing the drill and chuck in grinding position.

In the drawing, the reference numeral 11 designates a grinding wheel, mounted upon a spindle 12, and having a tool or work support 13. My drill holder is mounted upon suitable supporting means preferably comprising an angle bracket 14 secured to the tool support 13 by bolts 14', and a vertical standard 15 provided with a plurality of holes 16 by means of which it may be secured to the angle bracket 14 by bolts 15'. These members, viz: the bracket 14 and the standard 15, provide for adjustably mounting the drill holder in correct position relative to any grinding wheel.

The body of the drill holder is secured to or formed integrally with the upper end of the standard 15, and comprises a bed plate 17 and a vertical back plate 18. The bed plate 17 is segmental, having an inner edge 19 positioned horizontally and parallel with the face of the grinding wheel, and slopes downward away from the wheel at an angle of about 105°, thus providing an initial clearance on the face of the drill at its cutting edge of about 15°.

The back plate 18, integrally with or rigidly attached to the bed plate 17, forms a shoulder or stop at the rear edge 19' thereof. Said back plate is vertical when the inner edge 19 of the bed plate is horizontal, and its intersection with the bed plate makes an angle of 59° with said edge 19, this angle, 59°, corresponding to the standard angle between the axis and the cutting edge of twist drills. The back plate 18 has a guide rod 20 extending outwardly and sloping upwardly, said guide rod forming an angle of about 30 degrees with the surface of the bed plate.

The bed plate 17 has marked upon it a series of parallel guide lines 21, making an angle of about 39° with the inner edge 19, this being the usual grinding angle for the rear portion of the face of the drill, the difference between 59° and 39°, or 20° being the clearance of said rear face portion. A series of holes 22 are formed in the bed plate, near the outer ends of the guide lines 21, adapted for the reception of a removable stop pin 23.

In using the device, the drill 24 is first placed on the bed plate 17 against the back plate 18 with one of its cutting edges 25 in horizontal position against the wheel, as shown in Fig. 1. The corner between the bed plate 17 and the back plate 18 forms a seat in which the drill rests and by which it is firmly supported. The wheel is not rotating during this preliminary setting of the drill in position. The shank end of the drill is then swung forwardly until the drill is parallel with the guide lines 21, and the stop pin 23 is placed adjacent the forward side of said drill, as shown in Fig. 2. The position of the stop pin will depend upon the diameter of the drill.

The drill is then returned to its initial position, as in Fig. 1, and held with one hand (or by any suitable removable clamping device, not shown) with one of its cutting edges 25 horizontal or parallel with the inner edge 19 of the bed plate 17, while a guide chuck is clamped upon its shank. This chuck, shown in Figs. 4, 5 and 6, is separate from the body of the holder and may be of any suitable and convenient form, here shown as comprising two parallel blocks 27 secured together by clamping thumb screws 28, and having matching grooves 29 to embrace and hold the drill shank 26. A pair of parallel rods or arms 30 pass through the respective chuck blocks 27, and extend outwardly therefrom in opposite directions, at right angles to the axis of the drill. The arms 30 are symmetrical about the axis of the drill.

The guide chuck is clamped upon the drill in such a position that the inner face of one of the chuck blocks 27 rests against an adjustable stop in the form of a thumb screw 31, Figs. 1, 2, 3 and 6, mounted in the back plate 18. Moreover, in clamping the chuck upon the drill, one of the arms 30 is engaged with the forward side of the fixed guide rod 20 when the cutting edge 25 of the drill is horizontal. The chuck will then be in the position shown in Fig. 4.

Grinding can now be started. The stop screw 31 which limits the inward movement of the drill toward the wheel, is first backed away from the chuck, i. e., screwed inwardly, by the amount which it will be necessary to grind down the faces of the drill. The wheel 11 is started, the inner end of the drill is held in the seat formed by the bed plate 17 and the back plate 18 by one finger of the left hand, while the right hand grasps and holds the chuck in the position shown in Figs. 4 and 6. The drill is pressed inwardly against the wheel until the chuck again engages the stop screw 31, thus grinding one cutting edge 25 of the drill.

As soon as the grinding of the cutting edge stops, due to contact of the chuck with the stop screw 31, the chuck and drill are rotated, clockwise about the axis of the drill. This rotation, on account of the engagement between the guide rod 20 and the chuck arm 30, swings the drill forwardly until it engages the pin 23, that is to the position shown in Figs. 2 and 5. The simultaneous rotation and swinging movement of the drill, while in contact with the wheel, completes the grinding of one face 26 to the proper clearance.

The drill, still clamped in the chuck, is then withdrawn from contact with the wheel, rotated through 180°, and replaced in its initial grinding position with the second chuck arm 30 in contact with the guide rod 20. The grinding operation is then repeated, this time upon the second face of the drill.

In using the device illustrated in Figs. 1 to 6, as described above, the grinding of the cutting edge 25 of the drill face 26 is limited by the contact of the chuck 27 with the stop screw 31, and the slope of the bed plate 17 provides the proper clearance angle for said cutting edge. As the drill is swung forwardly and rotated, to grind the rear portion of the face 26, the chuck slides off the stop screw 31, and judgment must be exercised to limit, by hand, the grinding of the rear portion of the face to the proper amount. The amount of grinding required on the rear portion of the face 26, which merely provides clearance, is very little, and is not critical for most uses of the drill, so that sufficient accuracy for all ordinary purposes can be obtained by sight and feeling. The amount of grinding at the critical cutting edge 25 of the drill is, of course, positively and accurately limited by the stop screw 31.

In order to provide positive control and accuracy throughout the entire grinding operation, i. e., on the rear portion of the drill face 26 as well as at the cutting edge 25, a modified form of stop may be provided as shown in Figs. 7 and 8, which comprises a segmental plate 32 slidably mounted beneath the bed plate 17. The stop plate 32 has a slot 33 which slides in under-cut grooves 34 in a block 35 fixed to the under side of the bed plate, and has a curved outer edge 36 against which the chuck 27 bears to limit the inward feed of the drill during grinding. The stop plate 32 is adjustable in or out, and its position is determined by any suitable means such as a thumb screw 37 projecting from the block 35 and bearing against a lug 38 on the under side of the stop plate. The holes 22 for reception of the stop pin 23 may be formed either in the bed plate 17 or in the stop plate 32.

In using the form of device shown in Figs. 7 and 8, all operations as previously described are exactly the same, except that during the final grinding of the rear portion of the drill face 26, the chuck remains in contact with the curved edge 36 of the stop plate 32, and hence the amount of clearance grinding of said rear face portion is accurately and positively limited by the curvature of said edge. The plate 32 is removable, and may be replaced by another having an edge of different curvature, if it is desired to grind the drill faces with a different amount of clearance.

It will be seen that the angle between the axis and the cutting edge 25 of the drill, and the initial clearance angle of the face 26 at said cutting edge, are both automatically determined by the positions of the bed plate 17 and the back plate 18 with respect to the grinding wheel. It will also be seen that, because of the symmetrical arrangement of the chuck arms 30 and because the stop screw 31 (or the stop plate 32) remains set in one position, both cutting edges and both initial clearances are automatically ground symmetrically. This eliminates the necessity for any measurement of the drill faces and angles. Once the initial setting is properly made, the accurate and proper grinding of the critical portions of both faces is unavoidable.

Furthermore, the grinding of the less critical clearances on the rear portions of the drill faces 26 is limited with reasonable accuracy and symmetry in the form of holder shown in Figs. 1 to 6 by the judgment of the operator assisted and guided by the contact of the chuck arm 30 with the guide rod 20, and by contact of the drill with the stop pin 23. In the form of holder shown in Figs. 7 and 8, the rear face clearances are determined with absolute accuracy and symmetry by the cooperative action of the chuck arm 30 and guide rod 20, the stop pin 23, and the arcuate stop plate 32.

In this connection, it should be noted that the symmetry of the chuck arms is essential, and furthermore, that the number of such arms on the chuck must correspond with the number of cutting faces and grooves on the drill. Thus a two-groove drill requires a chuck having two opposite arms as shown, whereas a three-groove drill will require a chuck having three equally spaced and symmetrical arms.

It is noteworthy, also, that the drill is not clamped in the holder. Only the chuck is fastened upon the drill, so that the drill, in effect, is held in the hand and merely guided by the holder, and can be quickly removed for cooling and inspection, and instantly replaced in the holder in proper position for continuing the grinding. The initial setting of the chuck upon the drill, together with the initial setting of the pin 23 and the screw 31 or stop plate 32, determine and locate the proper positions of the drill in the holder for the entire grinding operation.

The initial settings referred to above, moreover, are simple and easy to make, requiring neither measurement nor calculation. The setting of the stop pin 23 can be simplified, if desired, by marking each of the holes 22 with the diameter of drill for which that particular position of said pin 23 is correct.

I claim:

1. A drill holder for grinders comprising a bed plate having an inner edge positioned adjacent the face of a grinding wheel, a back plate rising from a second and rear edge of said bed plate and forming therewith a seat for the drill while being ground, said seat forming an angle with the face of the wheel corresponding to the angle between the axis and the cutting face of the drill, an adjustable stop mounted on said bed plate in the outer and forward region thereof, said stop limiting the forward swinging movement of the drill during the grinding operation, a chuck removably mounted upon the drill, said chuck having a plurality of outwardly extending arms symmetrically disposed about the axis of the drill and corresponding in number to the cutting faces of the drill, and guide means positioned for engagement with said arms, said engagement guiding the chuck and the drill in rotary movement as the drill is swung from its rear position against the back plate to its forward position against said stop.

2. A drill holder for grinders comprising a bed plate positioned adjacent the face of a grinding wheel, a back plate rising from said bed plate and forming therewith a seat for the drill while being ground, a chuck removably mounted upon the drill, said chuck having a plurality of outwardly extending arms symmetrically disposed about the axis of the drill and corresponding in number to the cutting faces of the drill, an adjustable stop positioned for contact with said chuck to limit the inward movement of the drill toward the wheel, and guide means positioned for engagement with said arms, said engagement guiding the chuck and the drill in rotary movement when the drill is swung forwardly about its contact with the wheel as a center.

3. A drill holder for grinders comprising a body having a seat in which the drill rests during the grinding operation, said seat forming an angle with the face of the grinding wheel corresponding to the angle between the cutting edge and the axis of the drill, means for supporting said body in fixed relation to the wheel, a chuck removably mounted upon the drill, and guide members on the body and the chuck positioned for mutual engagement when the drill is in said seat, said engagement causing the chuck and the drill to have rotative movement when the drill is swung away from said seat about its contact with the wheel as a center.

4. A drill holder for grinders comprising a body having a bed plate of segmental form positioned adjacent a grinding wheel, said bed plate providing a seat upon which the drill rests during the grinding operation, spaced stops rising from said bed plate for contact with the drill to limit it in swinging movement about its contact with the wheel as a center, a chuck removably mounted upon the drill, and cooperating guide members on the body and the chuck positioned for mutual engagement, said guide members causing rotation of the drill when it is swung upon said bed plate between said stops.

5. A drill holder for grinders comprising a body having a bed plate positioned adjacent a grinding wheel, said bed plate providing a seat upon which the drill rests during the grinding operation, spaced stops rising from said bed plate positioned to guide the drill in proper angular relation to the face of the wheel, said stops permitting the drill to have limited swinging movement upon said bed plate about its contact with the wheel as a center, a chuck removably mounted upon the drill cooperating guide members on the body and the chuck positioned for mutual engagement to cause rotation of the drill when it is swung upon said bed plate between said stops, and another stop adjustably mounted on the body and having a curved outer edge positioned for contact with said chuck to limit inward movement of the drill toward the wheel.

6. A drill holder for grinders comprising a body having a bed plate positioned adjacent a grinding wheel, said bed plate providing a seat upon which the drill rests during the grinding operation, spaced stops rising from said bed plate positioned to guide the drill in proper angular relation to the face of the wheel, said stops permitting the drill to have limited swinging movement upon said bed plate about its contact with the wheel as a center, a chuck removably mounted upon the drill, cooperating guide members on the body and the chuck positioned for mutual engagement to cause rotation of the drill when it is swung upon said bed plate between said stops, and a movable plate mounted parallel with and adjacent to said bed plate, said movable plate having a curved outer edge projecting beyond the outer edge of said bed plate and positioned for engagement with said chuck to limit the inward movement of the drill toward the wheel.

7. A drill holder for grinders comprising a flat bed plate positioned adjacent the face of a grinding wheel, said plate forming a seat upon which the drill rests in grinding relation to the wheel, the drill being laterally movable upon said bed plate, a back plate rising from said bed plate and forming a guide for the drill in its initial position on said bed plate, a guide rod extending outwardly in a plane approximately parallel with said back plate, a chuck removably mounted upon the drill, said chuck having a plurality of outwardly extending arms positioned for engagement with said guide rod, said arms being symmetrically arranged about the axis of the drill and corresponding in number to the cutting faces of the drill, and the engagement of said arms with said guide rod causing the drill to have rotative movement when it is swung away from said back plate about its contact with the wheel as a center.

OLCOTT HASKELL.